United States Patent
Reithmaier et al.

(10) Patent No.: US 12,088,202 B2
(45) Date of Patent: Sep. 10, 2024

(54) SINGLE INDUCTOR BUCK-BOOST CONVERTER WITH AUXILIARY CAPACITOR

(71) Applicant: Texas Instruments Incorporated, Dallas, TX (US)

(72) Inventors: Stefan Alexander Reithmaier, Vilsheim (DE); Johann Erich Bayer, Freising (DE); Rüdiger Ganz, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 80 days.

(21) Appl. No.: 17/462,101

(22) Filed: Aug. 31, 2021

(65) Prior Publication Data
US 2023/0069710 A1 Mar. 2, 2023

(51) Int. Cl.
*H02M 3/158* (2006.01)

(52) U.S. Cl.
CPC ....... *H02M 3/1582* (2013.01); *H02M 3/1588* (2013.01)

(58) Field of Classification Search
CPC . H02M 3/1582; H02M 3/1584; H02M 3/1588
See application file for complete search history.

(56) References Cited

U.S. PATENT DOCUMENTS

| | | | | |
|---|---|---|---|---|
| 9,966,852 B1* | 5/2018 | Chen | ............... | H02M 3/1588 |
| 10,014,777 B1* | 7/2018 | Shumkov | ............ | H02M 3/1582 |
| 10,014,778 B1* | 7/2018 | Wei | ................ | H02M 3/1582 |
| 10,135,334 B1* | 11/2018 | Vinciarelli | ......... | H02M 3/1582 |
| 10,804,803 B1* | 10/2020 | Couleur | ............. | H02M 3/1584 |
| 2009/0237042 A1* | 9/2009 | Glovinski | ............ | H02M 3/158 323/235 |
| 2015/0222235 A1* | 8/2015 | Swanson | ............. | H02M 3/1582 330/251 |
| 2019/0214906 A1* | 7/2019 | Mahmoudi | ......... | H02M 3/1582 |
| 2021/0006162 A1* | 1/2021 | Ehrmann | ............. | H02M 3/1582 |
| 2021/0391794 A1* | 12/2021 | Somani | .............. | H02M 3/1582 |

* cited by examiner

*Primary Examiner* — Kyle J Moody
*Assistant Examiner* — Jye-June Lee
(74) *Attorney, Agent, or Firm* — Ray A. King; Frank D. Cimino

(57) ABSTRACT

A buck-boost converter includes a voltage input terminal, a voltage output terminal, a first switch, a second switch, an inductor, a third switch, and an auxiliary capacitor. The first switch includes a first terminal coupled to the voltage input terminal, and a second terminal. The second switch includes a first terminal coupled to the voltage output terminal, and a second terminal. The inductor is coupled between the second terminal of the first switch and the second terminal of the second switch. The third switch includes a first terminal coupled to the second terminal of the second switch, and a second terminal. The auxiliary capacitor is coupled to the second terminal of the third switch.

12 Claims, 5 Drawing Sheets

SINGLE INDUCTOR BUCK-BOOST CONVERTER WITH AUXILIARY CAPACITOR

BACKGROUND

A DC-DC converter is an electronic circuit that converts an input direct current (DC) supply voltage into one or more DC output voltages that are higher or lower in magnitude than the input DC supply voltage. A DC-DC converter supply that generates an output voltage lower than the input voltage is termed a buck or step-down converter. A DC-DC converter that generates an output voltage higher than the input voltage is termed a boost or step-up converter. A DC-DC converter that generates a selected output voltage, from an input voltage that is higher or lower than the output voltage is termed a buck-boost converter.

SUMMARY

In described examples, a buck-boost converter achieves improved battery capacity utilization. In one example, a buck-boost converter includes a voltage input terminal, a voltage output terminal, a first inductor terminal, a second inductor terminal, an auxiliary capacitor terminal, a first switch, a second switch, and a third switch. The first switch is coupled between the voltage input terminal and the first inductor terminal. The second switch is coupled between the second inductor terminal and the voltage output terminal. The third switch is coupled between the second inductor terminal and the auxiliary capacitor terminal.

In another example, a buck-boost converter includes a voltage input terminal, a voltage output terminal, a first inductor terminal, a second inductor terminal, an auxiliary capacitor terminal, a first switch, a second switch, and a third switch. The voltage input terminal is adapted to be coupled to a voltage source. The voltage output terminal is adapted to be coupled to an output capacitor. The first inductor terminal is adapted to be coupled to a first terminal of an inductor. The second inductor terminal is adapted to be coupled to a second terminal of the inductor. The auxiliary capacitor terminal is adapted to be coupled to an auxiliary capacitor. The first switch is coupled between the voltage input terminal and the first inductor terminal, and is configured to switch current from the voltage input terminal to the inductor. The second switch is coupled between the second inductor terminal and the voltage output terminal, and is configured to switch current from the inductor to the output capacitor coupled to the voltage output terminal. The third switch is coupled between the second inductor terminal and the auxiliary capacitor terminal, and is configured to switch current from the inductor to the auxiliary capacitor coupled to the auxiliary capacitor terminal.

In a further example, a buck-boost converter includes a voltage input terminal, a voltage output terminal, a first switch, a second switch, an inductor, a third switch, and an auxiliary capacitor. The first switch includes a first terminal coupled to the voltage input terminal, and a second terminal. The second switch includes a first terminal coupled to the voltage output terminal, and a second terminal. The inductor is coupled between the second terminal of the first switch and the second terminal of the second switch. The third switch includes a first terminal coupled to the second terminal of the second switch, and a second terminal. The auxiliary capacitor is coupled to the second terminal of the third switch.

DETAILED DESCRIPTION

Portable electronic devices are generally powered by batteries. To increase operating life, a portable device may operate with a pulsed or dynamic load, and with as low a low battery voltage as possible. The batteries used to power portable devices may provide relatively long life, but may be current limited (e.g., lithium coin cells, lithium sulfur dioxide, lithium sulfur, etc.). Pulsed currents provided to operate dynamic loads may degrade the life of current limited batteries. In many portable devices, the full battery capacity cannot be used because high current pulses (e.g., from a current limited battery) can cause a brown out fault or system shut down, especially near the end of the battery discharge profile.

The buck-boost converters described herein provide improved battery life while reducing circuit size and cost. The converters provide buck-boost functionality using a single inductor and an auxiliary capacitor, and do not require an additional boost converter. The auxiliary capacitor provides the difference in energy needed to power the load and the energy provided by the battery. Use of the auxiliary capacitor improves the load transient response of the converter, and enables operation with high capacity batteries (e.g., current limited batteries). The improved load transient response allows the size of the converter output capacitor to be reduced.

Figure 1:
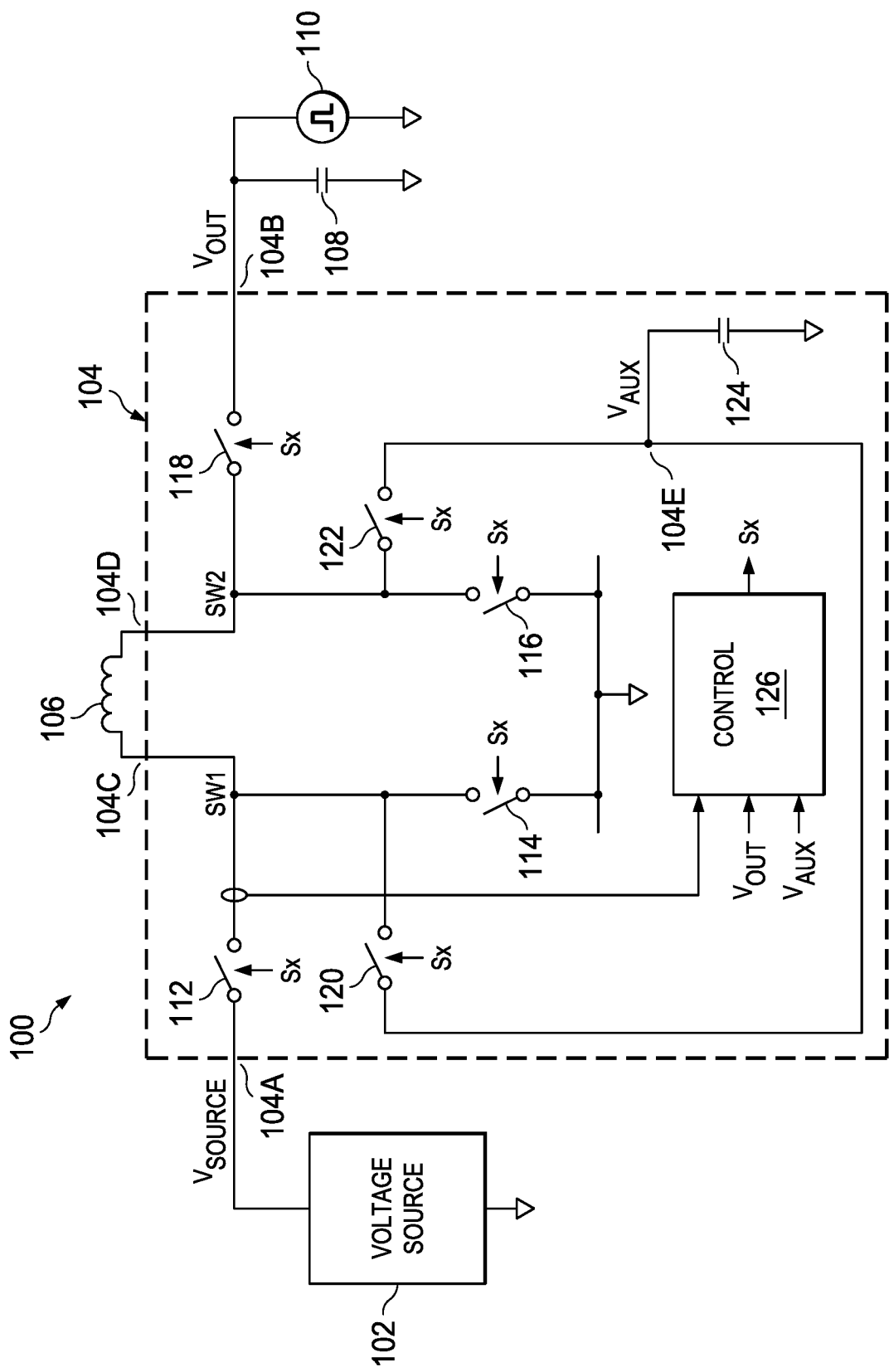
FIG. 1 is a block diagram for an example single inductor buck-boost converter with an auxiliary capacitor for improved battery utilization as described herein.

FIG. 1 is a block diagram for an example single inductor buck-boost converter 100 with improved battery utilization. The single inductor buck-boost converter 100 includes a voltage source 102, a buck-boost controller 104, an inductor 106, and an output capacitor 108. A load circuit 110 is coupled to the output capacitor 108. The voltage source 102, the inductor 106, and the output capacitor 108 are coupled to the buck-boost controller 104.

The buck-boost controller 104 includes a voltage input terminal 104A, a voltage output terminal 104B, an inductor terminal 104C, an inductor terminal 104D, and an auxiliary capacitor terminal 104E. The voltage source 102 is coupled to the voltage input terminal 104A of the buck-boost controller 104. The voltage source 102 may be a battery (e.g., a current limited battery), a solar cell, etc., and provides input voltage $V_{SOURCE}$ to the buck-boost controller 104.

The inductor 106 stores energy received from the voltage source 102. The inductor terminal 104C of the buck-boost controller 104 is coupled to a first terminal of the inductor 106, and the inductor terminal 104D of the buck-boost controller 104 is coupled to a second terminal of the inductor 106. The output capacitor 108 is coupled to the voltage output terminal 104B of the buck-boost controller 104 for storage of energy output from the buck-boost controller 104.

An auxiliary capacitor 124 is coupled to the auxiliary capacitor terminal 104E of the buck-boost controller 104. In some implementations of the buck-boost controller 104, the auxiliary capacitor terminal 104E may provide an external connection to the buck-boost controller 104, and the auxiliary capacitor 124 may external to the buck-boost controller 104. For example, the buck-boost controller 104 may be formed on an integrated circuit, and the auxiliary capacitor 124 may be a discrete capacitor external to the integrated circuit.

The buck-boost controller 104 includes a switch 112, a switch 114, a switch 116, a switch 118, a switch 120, and a switch 122. The switches 112-122 may be implemented using transistors (e.g., N or P channel metal oxide semiconductor field effect transistors). The switch 112 switches current from the voltage source 102 to the inductor 106 for charging of the inductor 106. A first terminal of the switch 112 is coupled to the voltage input terminal 104A of the buck-boost controller 104, and second terminal of the switch 112 is coupled to the inductor terminal 104C of the buck-boost controller 104. The switch 118 switches current from the inductor 106 to the output capacitor 108 and the load circuit 110 for discharging the inductor 106. A first terminal of the switch 118 is coupled to the inductor terminal 104D, and a second terminal of the switch 118 is coupled to the voltage output terminal 104B.

The switch 116 connects the inductor 106 to ground for charging, and the switch 114 connects the inductor 106 to ground for discharging. A first terminal of the switch 116 is coupled to the inductor terminal 104D of the buck-boost controller 104, and second terminal of the switch 116 is coupled to ground. A first terminal of the switch 114 is coupled to the inductor terminal 104C, and a second terminal of the switch 114 is coupled to ground. In a pause phase of operation of the single inductor buck-boost converter 100, the switches 114 and 116 may be closed recirculate current through the inductor 106.

The switch 122 connects the auxiliary capacitor 124 to the inductor 106 for charging of the auxiliary capacitor 124. The auxiliary capacitor 124 may be charged to the highest voltage provided at the inductor terminal 104D. A first terminal of the switch 122 is coupled to the inductor terminal 104D and a second terminal of the switch 122 is coupled to the auxiliary capacitor terminal 104E. The switch 120 connects the auxiliary capacitor 124 to the inductor 106 for charging the inductor 106 from the auxiliary capacitor 124. A first terminal of the switch 120 is coupled to the auxiliary capacitor terminal 104E, and the second terminal of the switch 120 is coupled to the inductor terminal 104C.

The buck-boost controller 104 includes a control circuit 126 that controls the switches 112-122 based on the current sensed at the inductor terminal 104C, the output voltage $V_{OUT}$ at the voltage output terminal 104B and the auxiliary voltage $V_{AUX}$ at the auxiliary capacitor terminal 104E. The control circuit 126 includes an input coupled to the inductor terminal 104C, an input coupled to the voltage output terminal 104B, and an input coupled to the auxiliary capacitor terminal 104E. The control circuit 126 includes multiple switch control outputs. Switch control signals (Sx) provided at the switch control outputs are provided to the switches 112-122 (control terminals of the switches 112-122) to set the switches 112-122 as needed for generating $V_{OUT}$.

In implementations of the buck-boost controller 104 formed on an integrated circuit, various components of the buck-boost controller 104 may be separate from and external to the integrated circuit. For example, one or more of the switches 112-122 may be external to the integrated circuit. Drive circuitry (not shown) for opening and closing the switches may be provided on a separate integrated circuit in some implementations.

Figure 2:
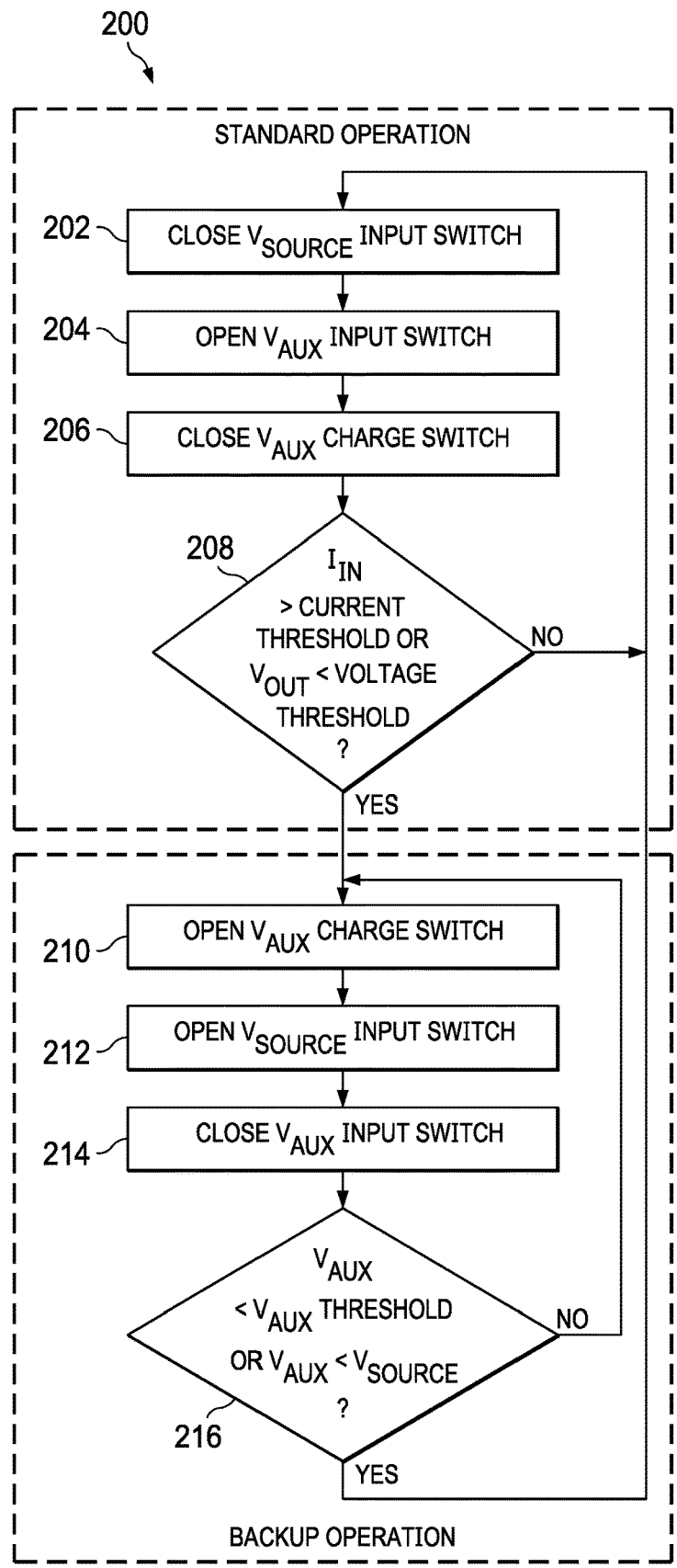
FIG. 2 is a flow diagram for an example method for operating the single inductor buck-boost converter of FIG. 1.

FIG. 2 is a flow diagram for an example method 200 for operating the single inductor buck-boost converter 100. Though depicted sequentially as a matter of convenience, at least some of the actions shown can be performed in a different order and/or performed in parallel. Additionally, some implementations may perform only some of the actions shown.

In the method 200, blocks 202-208 illustrate standard operation of the single inductor buck-boost converter 100, and blocks 216-210 illustrate backup operation of the single inductor buck-boost converter 100. In standard operation, the inductor 106 is charged from the voltage source 102 and the auxiliary capacitor 124 is charged from the inductor 106. In backup operation, the inductor 106 is charged from the auxiliary capacitor 124.

In block 202, the control circuit 126 closes the switch 112 to switch current from the voltage source 102 to the inductor 106.

In block 204, the control circuit 126 opens the switch 120 to isolate the auxiliary capacitor 124 from the inductor terminal 104C.

In block 206, the control circuit 126 closes the switch 122 to charge the auxiliary capacitor 124 from the output of the inductor 106.

In block 208, the control circuit 126 compares the input current ($I_{IN}$) flowing into the inductor 106 to a current threshold, and compares the output voltage $V_{OUT}$ to a voltage threshold. If the input current is greater than the current threshold or the output voltage is less than the voltage threshold, then the single inductor buck-boost converter 100 transitions from standard operation to backup operation.

In block 210, the control circuit 126 opens the switch 122 to discontinue charging of the auxiliary capacitor 124.

In block 212, the control circuit 126 opens the switch 112 to discontinue charging of the inductor 106 from the voltage source 102.

In block 214, the control circuit 126 closes the switch 120 to switch current from the auxiliary capacitor 124 to the inductor 106.

In block 216, the control circuit 126 compares the voltage across the auxiliary capacitor 124 $V_{AUX}$ to a $V_{AUX}$ threshold and compares $V_{AUX}$ to the voltage $V_{SOURCE}$ at the voltage input terminal 104A. If $V_{AUX}$ is less than the $V_{AUX}$ threshold or $V_{AUX}$ is less than $V_{SOURCE}$, then the single inductor buck-boost converter 100 transitions from backup operation to standard operation.

Figure 3:
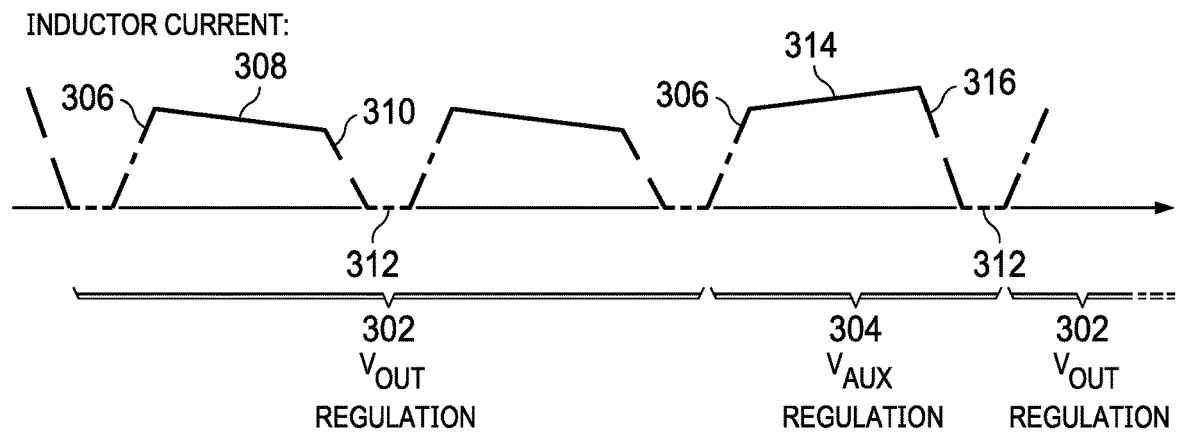
FIG. 3 shows an example of inductor current in four-phase operation of the single inductor buck-boost converter of FIG. 1.

FIG. 3 shows an example of inductor current in four-phase operation of the single inductor buck-boost converter 100. In interval 302, the single inductor buck-boost converter 100 regulates $V_{OUT}$, and in interval 304, the single inductor buck-boost converter 100 regulates $V_{AUX}$. In region 306, the control circuit 126 closes the switch 112 and the switch 116, and opens the switches 114, 118, 120, and 122 to charge the inductor 106 from the voltage source 102.

In region 308, the control circuit 126 closes the switch 112 and the switch 118, and opens the switch 114, the switch 116, the switch 120, and the switch 122 to enable current flow through the inductor 106 to the output capacitor 108 and the load circuit 110.

In region 310, the control circuit 126 closes the switch 114 and the switch 118, and opens the switch 112, the switch 116, the switch 120, and the switch 122 to discharge the inductor 106 into the output capacitor 108 and the load circuit 110.

In region 312, the control circuit 126 closes the switch 114 and the switch 116, and opens the switch 112, the switch 118, the switch 120, and the switch 122 to recirculate current in the inductor 106.

In region 314, the control circuit 126 closes the switch 112 and the switch 122, and opens the switch 114, the switch 116, the switch 118, and the switch 120 to charge the auxiliary capacitor 124 from the inductor 106.

In region 316, the control circuit 126 closes the switch 114 and the switch 122, and opens the switch 112, the switch 116, the switch 118, and the switch 120 to charge the auxiliary capacitor 124 from the inductor 106.

Figure 4:
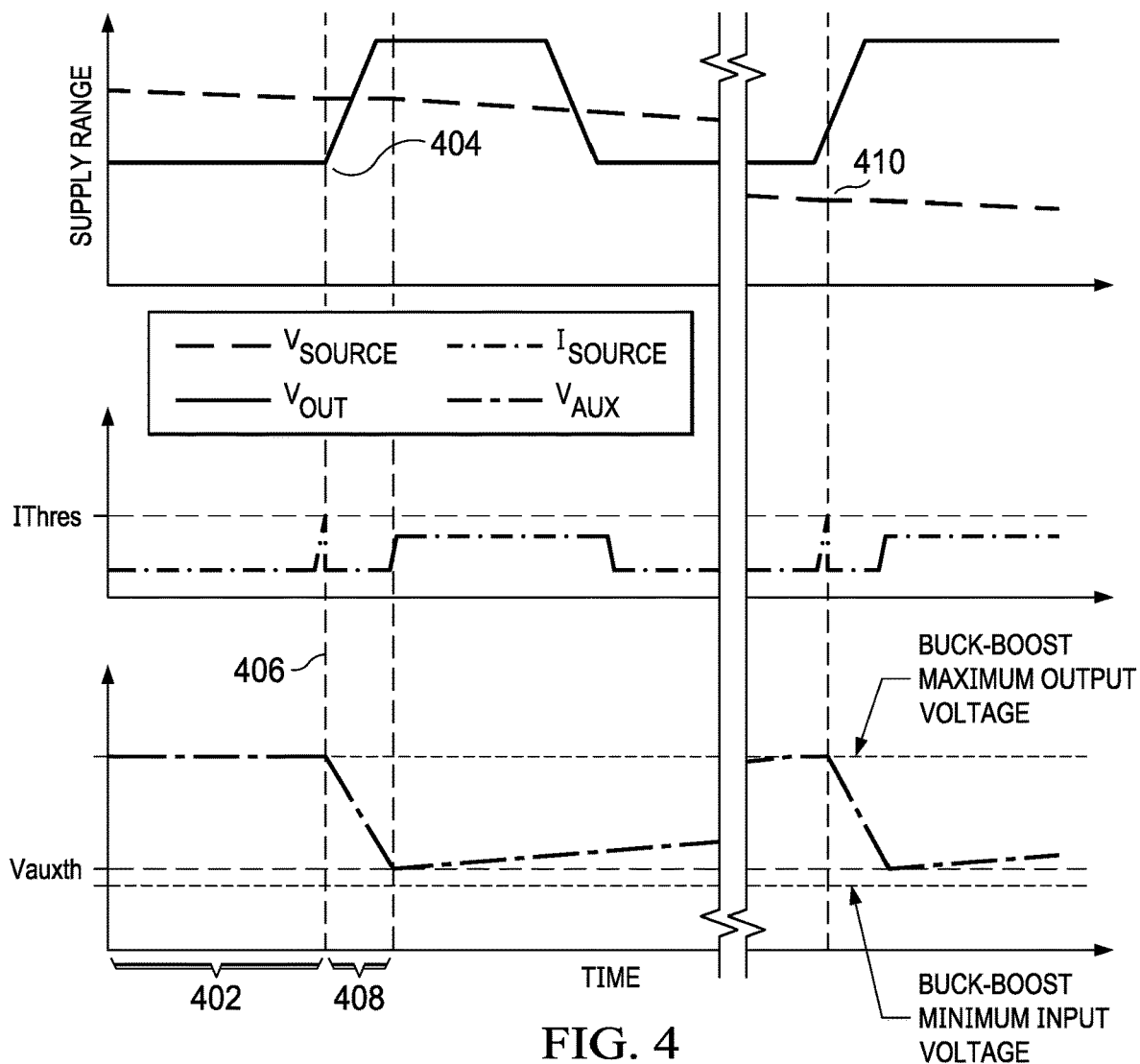
FIG. 4 shows example signals in a single inductor buck-boost converter for increasing battery capacity utilization.

FIG. 4 shows example signals in the single inductor buck-boost converter 100 illustrating increased battery capacity utilization. In FIG. 4, the load circuit 110 is resistive, and $V_{OUT}$ is greater than $V_{SOURCE}$. In the interval 402, the switch 120 is open and the switch 122 is closed to charge the auxiliary capacitor 124. At time 404, the switch 112 is closed to charge the inductor 106 from the voltage source 102. At time 406, the current flow from the voltage source 102 exceeds the input current threshold, and in response, the switch 112 and the switch 122 are opened, and the switch 120 is closed in the interval 408 to charge the inductor 106 from the auxiliary capacitor 124. $V_{SOURCE}$ does not drop in the interval 408 because current flow to the inductor 106 is from the auxiliary capacitor 124 rather than the voltage source 102. As the auxiliary capacitor 124 discharges, and $V_{AUX}$ falls to the $V_{AUX}$ threshold, the switch 120 is opened, the switch 122 is closed to recharge the auxiliary capacitor 124, and the switch 112 is closed to switch current from the voltage source 102 to the inductor 106.

Over time, as $V_{SOURCE}$ continues to fall over the life of the voltage source 102, use of the auxiliary capacitor 124 to charge the inductor 106 allows the single inductor buck-boost converter 100 to operate without triggering an undervoltage event that may otherwise cause the converter to shut down. For example, at time 410 no undervoltage event is triggered when $V_{SOURCE}$ is relatively low and the current flow from the voltage source 102 exceeds the input current threshold. Thus, the single inductor buck-boost converter 100 is able to operate with a lower value of $V_{SOURCE}$ than other buck-boost converter implementations.

Figure 5:
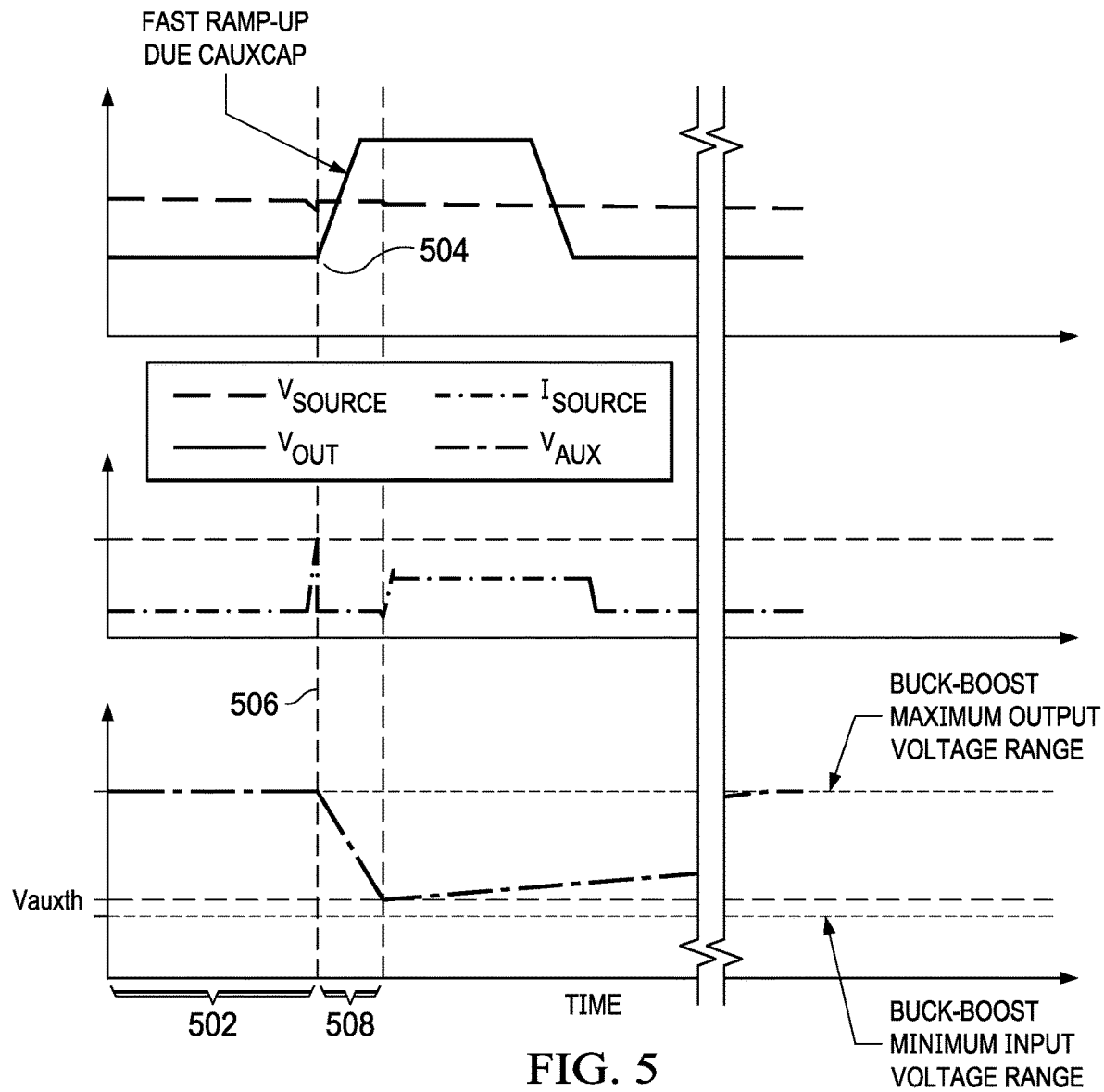
FIG. 5 shows example signals in a single inductor buck-boost converter for operating with current limited voltage source.

FIG. 5 shows example signals in the single inductor buck-boost converter 100 when operating with a current limited voltage source. In FIG. 5, the load circuit 110 is resistive, and $V_{OUT}$ is greater than $V_{SOURCE}$. In the interval 502, the switch 120 is open and the switch 122 is closed to charge the auxiliary capacitor 124. At time 504, the switch 112 is closed to charge the inductor 106 from the voltage source 102. The voltage source 102 is current limited. At time 506, the current flow from the voltage source 102 exceeds the input current threshold, and in response, the switch 112 and the switch 122 are opened, and the switch 120 is closed in the interval 508 to charge the inductor 106 from the auxiliary capacitor 124. Because the inductor 106 is charged from the auxiliary capacitor 124 in the interval 508, $V_{OUT}$ ramps up more quickly that would be possible with the voltage source 102 (the current limited voltage source). $V_{SOURCE}$ does not drop in the interval 508 because current flow to the inductor 106 is from the auxiliary capacitor 124 rather than the voltage source 102. As the auxiliary capacitor 124 discharges, and $V_{AUX}$ falls to the $V_{AUX}$ threshold, the switch 120 is opened, the switch 122 is closed to recharge the auxiliary capacitor 124, and the switch 112 is closed to switch current from the voltage source 102 to the inductor 106.

Figure 6:
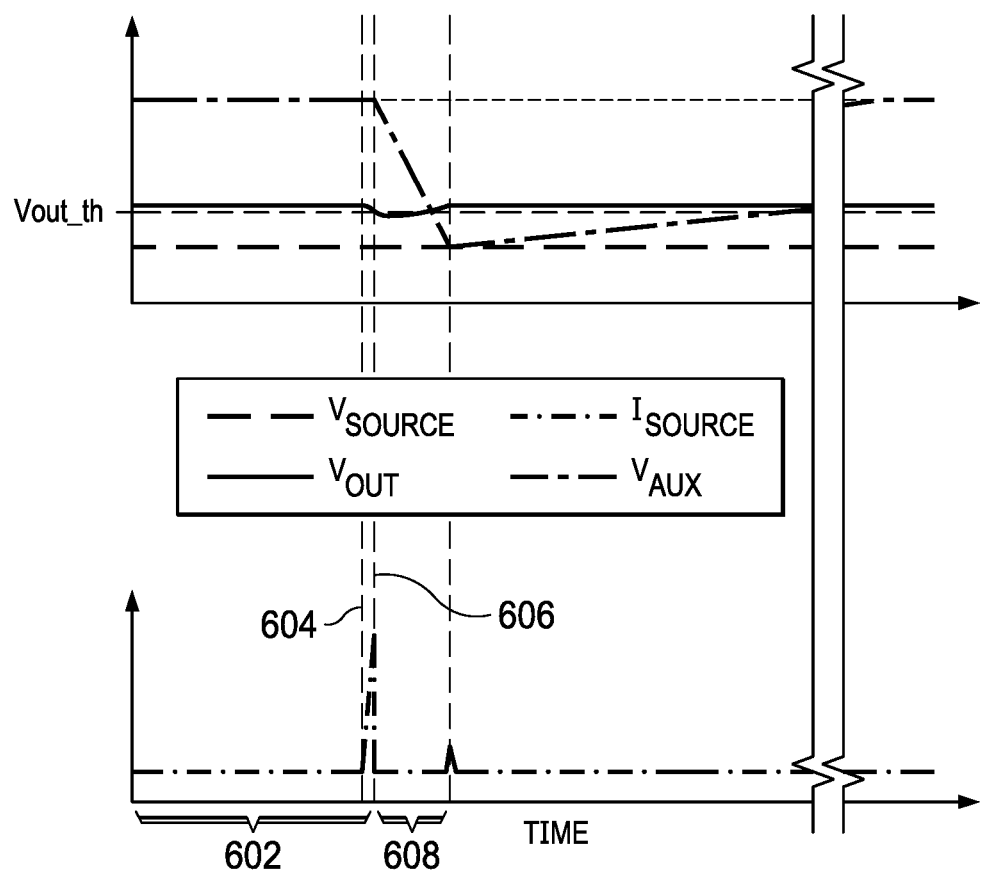
FIG. 6 shows an example of improved transient response in a single inductor buck-boost converter.

FIG. 6 shows an example of improved transient response provided by the single inductor buck-boost converter 100. In FIG. 6, $V_{OUT}$ is greater than $V_{SOURCE}$. In the interval 602, the switch 120 is open and the switch 122 is closed to charge the auxiliary capacitor 124. At time 604, the switch 112 is closed to charge the inductor 106 from the voltage source 102. At time 606, $V_{OUT}$ falls below the output voltage threshold, and in response, the switch 112 and the switch 122 are opened, and the switch 120 is closed in the interval 608 to charge the inductor 106 from the auxiliary capacitor 124. Because the inductor 106 is charged from the auxiliary capacitor 124 in the interval 608, the amplitude of the transient present on $V_{OUT}$ is reduced relative to charging the inductor 106 from the voltage source 102. Because $V_{AUX}$ is higher than $V_{OUT}$ at the start of the interval 608, the single inductor buck-boost converter 100 operates in buck mode for at least a portion of the interval 608. Buck mode has fewer bandwidth limitations than boost mode, and therefore allows for faster regulation.

In this description, the term "couple" may cover connections, communications or signal paths that enable a functional relationship consistent with this description. For example, if device A generates a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal generated by device A.

Modifications are possible in the described embodiments, and other embodiments are possible, within the scope of the claims.

What is claimed is:

1. A buck-boost converter, comprising:
a first switch coupled between a voltage input terminal and a first inductor terminal;
a second switch coupled between a second inductor terminal and a voltage output terminal;
a third switch coupled between the second inductor terminal and an auxiliary capacitor terminal and having a third control terminal;
a control circuit having first, second and third control inputs and first, second and third control outputs, wherein the first control input is directly coupled to the auxiliary capacitor terminal, the second control input is coupled to the voltage output terminal, the third control input is coupled to the first inductor terminal, the first control output is coupled to a control terminal of the first switch, and the third control output is coupled to the third control terminal;
a fourth switch coupled between the first inductor terminal and a ground terminal, wherein the control circuit is configured to close the fourth switch to discharge an inductor; and
a fifth switch coupled between the auxiliary capacitor terminal and the first inductor terminal, and configured to close responsive to an input current through the first switch being greater than an input current threshold, or an output voltage at the voltage output terminal being less than an output voltage threshold.

2. The buck-boost converter of claim 1, further comprising a sixth switch coupled between the second inductor terminal and the ground terminal.

3. The buck-boost converter of claim 1, wherein the control circuit is further coupled to the second switch.

4. The buck-boost converter of claim 1, further comprising a capacitor coupled between the auxiliary capacitor terminal and the ground terminal.

5. A buck-boost converter, comprising:
- a voltage source coupled to a voltage input terminal;
- an output capacitor coupled to a voltage output terminal;
- an inductor having first and second inductor terminals;
- an auxiliary capacitor coupled to an auxiliary capacitor terminal;
- a first switch directly coupled between the voltage input terminal and the first inductor terminal and having a first control terminal;
- a second switch coupled between the second inductor terminal and the voltage output terminal and having a second control terminal;
- a third switch coupled between the second inductor terminal and the auxiliary capacitor terminal and having a third control terminal, and configured to selectively provide current from the inductor to the auxiliary capacitor;
- a control circuit having first, second and third control inputs and first, second and third control outputs, wherein the second control input is coupled to the voltage output terminal, the first control input is directly coupled to the auxiliary capacitor terminal, the third control input is coupled to the first inductor terminal, the first control output is coupled to the first control terminal, the second control output is coupled to the second control terminal, and the third control output is coupled to the third control terminal;
- a fourth switch coupled between the first inductor terminal and a ground terminal, wherein the control circuit is configured to close the fourth switch to discharge the inductor; and
- a fifth switch coupled between the auxiliary capacitor terminal and the first inductor terminal, and configured to close responsive to an input current through the first switch being greater than an input current threshold, or an output voltage at the voltage output terminal being less than an output voltage threshold.

6. The buck-boost converter of claim 5, wherein the auxiliary capacitor and the third switch are disposed on a same integrated circuit.

7. The buck-boost converter of claim 5, wherein the control circuit is configured to open the first switch and the third switch, and close the fifth switch to switch current from the auxiliary capacitor to the inductor.

8. The buck-boost converter of claim 7, further comprising a sixth switch coupled between the second inductor terminal and the ground terminal, wherein the control circuit is configured to close the first switch and the sixth switch, and open the fifth switch to charge the inductor.

9. The buck-boost converter of claim 8, wherein the control circuit is configured to close the fourth switch and the sixth switch to circulate current in the inductor.

10. A buck-boost converter, comprising:
- a first switch having first and second switch terminals and a first control terminal, wherein the first switch terminal is coupled to an input voltage terminal;
- a second switch having third and fourth switch terminals and a second control terminal, wherein the third switch terminal is coupled to a voltage output terminal;
- an inductor coupled between the second switch terminal and the fourth switch terminal;
- a third switch having fifth and sixth switch terminals and a third control terminal, wherein the fifth switch terminal is coupled to the fourth switch terminal;
- a capacitor coupled to the sixth switch terminal;
- a control circuit having first, second and third control inputs and first, second and third control outputs, wherein the first control input is directly coupled to the capacitor, the second control input is coupled to the voltage output terminal, the third control input is coupled to the inductor, the first control output is coupled to the first control terminal, the second control output is coupled to the second control terminal, and the third control output is coupled to the third control terminal; and
- a fourth switch having seventh and eighth switch terminals, wherein the seventh switch terminal is coupled to the inductor, the eighth switch terminal is coupled to a ground terminal, and the control circuit is configured to close the fourth switch to discharge the inductor; and
- a fifth switch coupled between the capacitor and an inductor, and configured to close responsive to an input current through the first switch being greater than an input current threshold, or an output voltage at the voltage output terminal being less than an output voltage threshold.

11. The buck-boost converter of claim 10, further comprising a sixth switch having eleventh and twelfth switch terminals, wherein the eleventh switch terminal is coupled to the fourth switch terminal, and the twelfth switch terminal is coupled to the ground terminal.

12. The buck-boost converter of claim 10, wherein the control circuit is configured to open the first switch and the third switch, and close the fifth switch to discharge current from the capacitor into the inductor.

* * * * *